US006743032B2

(12) United States Patent
Ogren et al.

(10) Patent No.: US 6,743,032 B2
(45) Date of Patent: Jun. 1, 2004

(54) DIGITAL CROSS CONNECT MODULE WITH REMOVABLE JACK

(75) Inventors: Bruce C. Ogren, Edina, MN (US); David J. Anderson, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/209,027

(22) Filed: Jul. 30, 2002

(65) Prior Publication Data

US 2003/0022543 A1 Jan. 30, 2003

Related U.S. Application Data

(63) Continuation of application No. 09/510,867, filed on Feb. 23, 2000, now Pat. No. 6,589,062, which is a continuation-in-part of application No. 09/286,871, filed on Apr. 6, 1999, now abandoned.

(51) Int. Cl.[7] .............................................. H01R 29/00
(52) U.S. Cl. ...................................... 439/188; 439/668
(58) Field of Search ................................ 439/188, 668, 439/669, 944

(56) References Cited

U.S. PATENT DOCUMENTS

| 4,749,968 A | * | 6/1988 | Burroughs ................ 333/105 |
| 4,768,961 A | | 9/1988 | Lau ............................ 439/61 |
| 4,815,104 A | * | 3/1989 | Williams et al. ........... 375/257 |
| 4,840,568 A | | 6/1989 | Burroughs et al. ........... 439/49 |
| 5,124,673 A | * | 6/1992 | Hershberger ................ 333/18 |
| 5,199,878 A | | 4/1993 | Dewey et al. ................ 439/49 |
| 5,233,501 A | * | 8/1993 | Allen et al. ................ 361/733 |
| 5,246,378 A | * | 9/1993 | Seiceanu ..................... 439/188 |
| 5,348,491 A | * | 9/1994 | Louwagie et al. ........... 439/188 |
| 5,393,249 A | | 2/1995 | Morgenstern et al. ........ 439/668 |
| 5,413,494 A | | 5/1995 | Dewey et al. ............... 439/188 |
| 5,438,617 A | | 8/1995 | Hill et al. ................... 379/327 |
| 5,467,062 A | * | 11/1995 | Burroughs .................. 333/124 |
| 5,594,347 A | * | 1/1997 | Louwagie et al. ........... 324/539 |
| 5,685,741 A | * | 11/1997 | Dewey et al. ............... 439/668 |
| 5,702,262 A | | 12/1997 | Brown et al. ............... 439/188 |
| 5,885,096 A | * | 3/1999 | Ogren ........................ 439/188 |
| 5,913,701 A | * | 6/1999 | Olson et al. ................ 439/668 |
| 5,997,311 A | * | 12/1999 | Crouse et al. ................ 439/49 |

FOREIGN PATENT DOCUMENTS

WO     WO 98/45905     10/1998

OTHER PUBLICATIONS

Thomas & Betts copy of brochure "HDDX High Density Digital Cross–Connect, 1999, 6 pages."

* cited by examiner

*Primary Examiner*—Hae Moon Hyeon
(74) *Attorney, Agent, or Firm*—Merchant & Gould P.C.

(57) ABSTRACT

A switching coax jack module and jack component provide for a removable DSX jack which can be slid into and out of the front of a jack module housing without disconnecting other components of the jack module and without disconnecting the module from a chassis. The jack includes a projecting post, and two rear ports. The post and rear ports cooperate with a rear interface unit including two projecting plugs, and a port for the post. The rear interface unit may include a switch activated by the post for disconnecting two of the rear connectors of the module when the jack is mounted to the module and engaged with the rear interface unit.

14 Claims, 19 Drawing Sheets

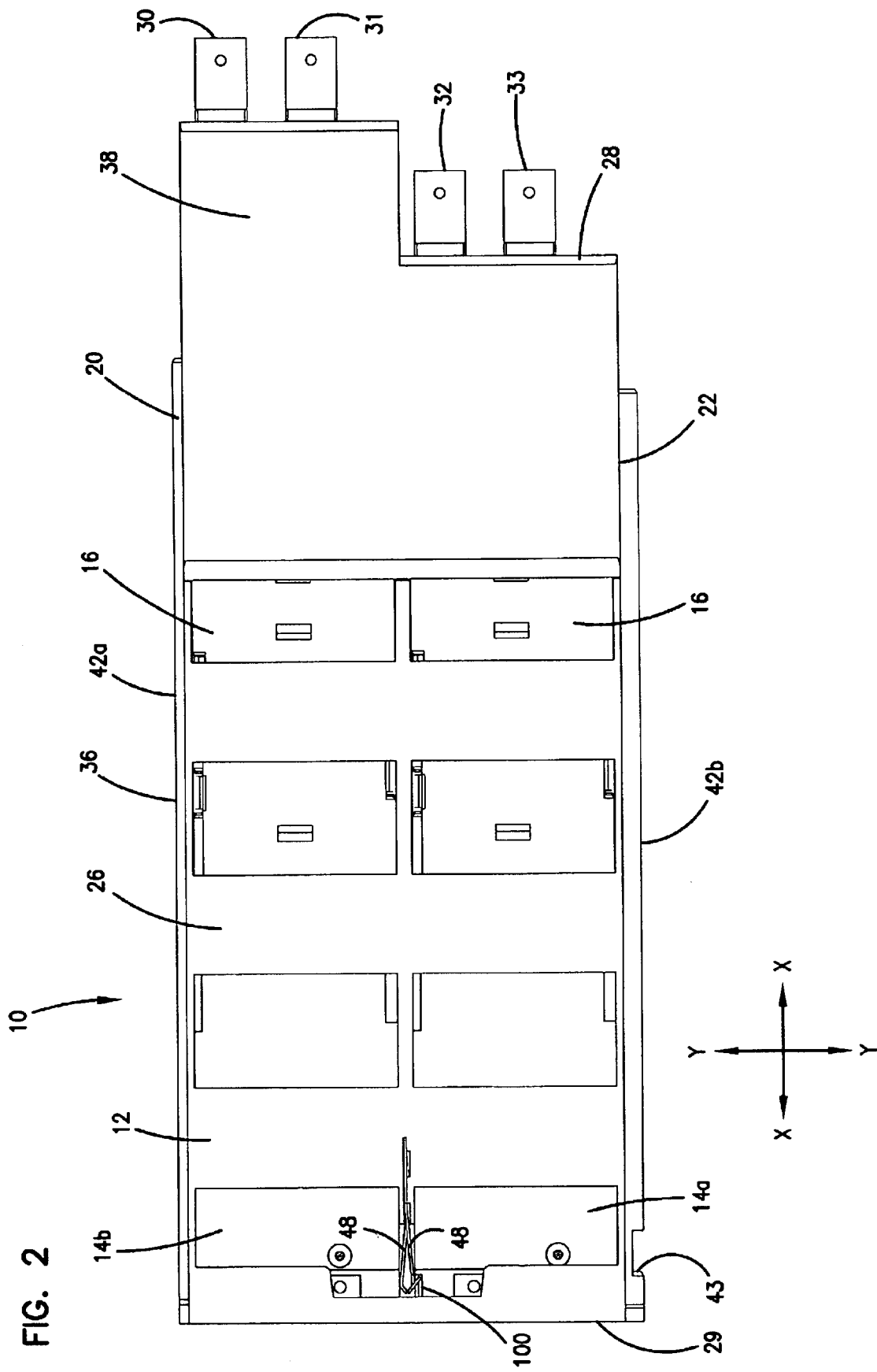

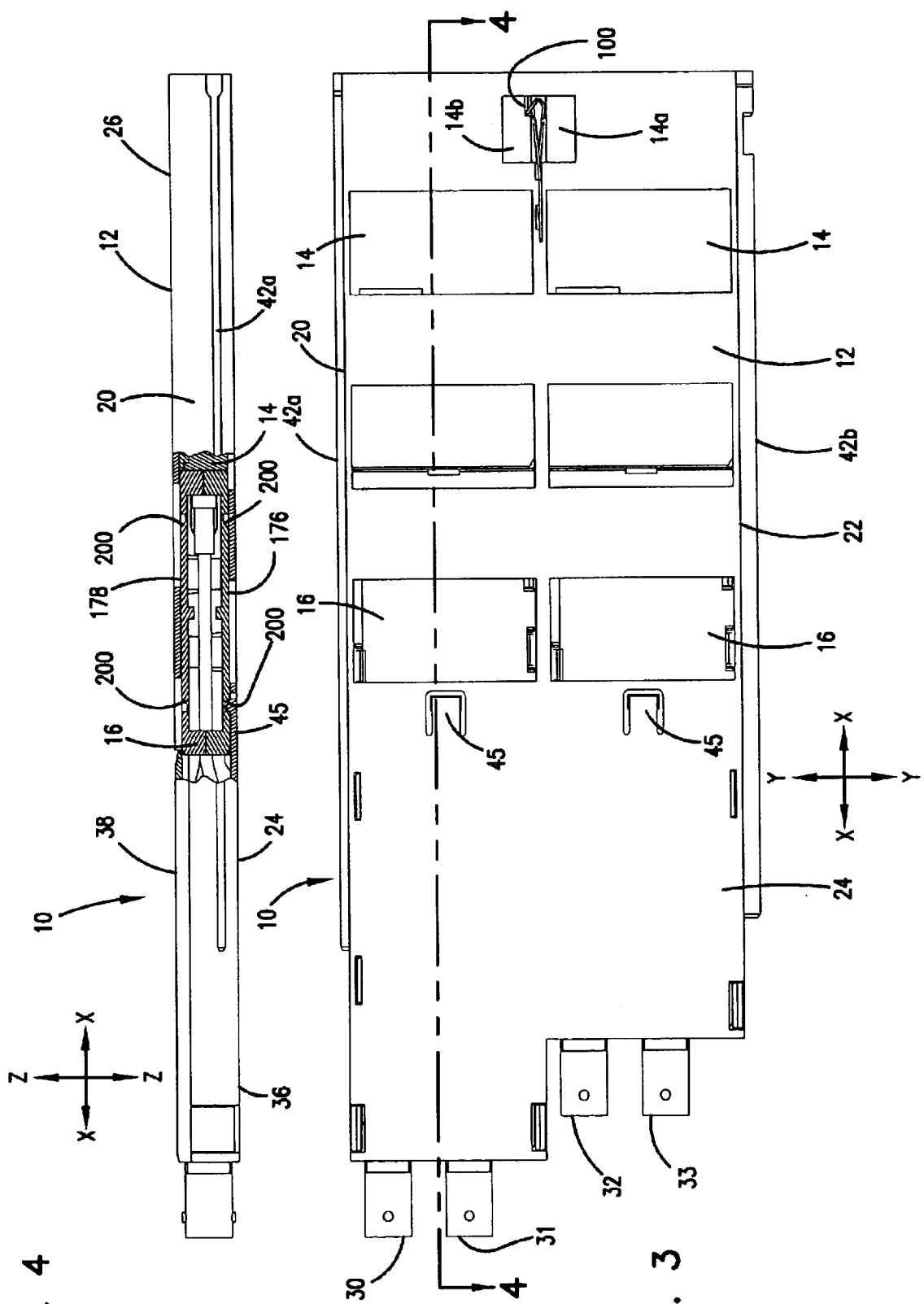

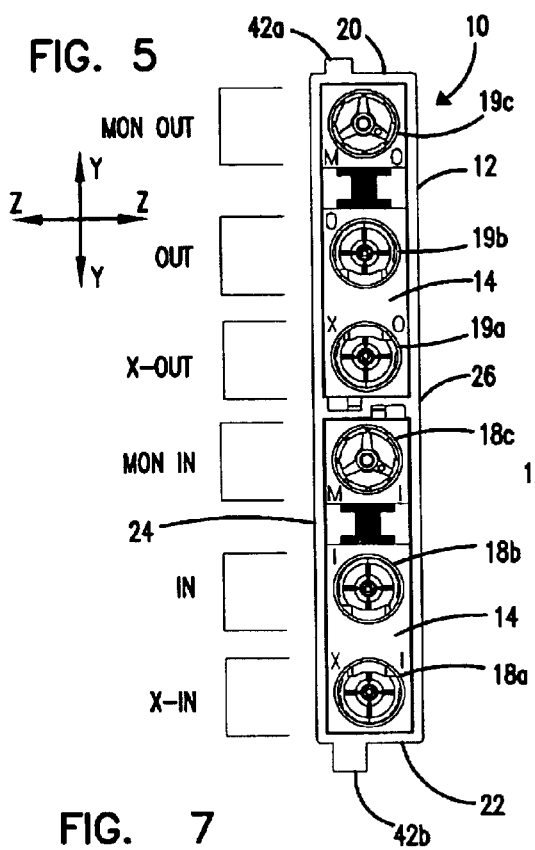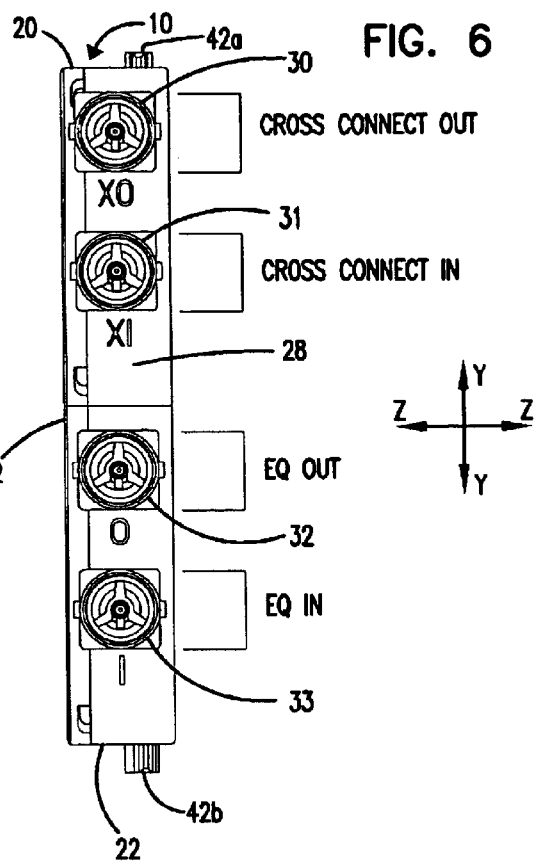

SCHEMATIC
R1 = 93.1 OHMS
R2 = 464 OHMS
R3 = 75 OHMS

US 6,743,032 B2

DIGITAL CROSS CONNECT MODULE WITH REMOVABLE JACK

RELATED APPLICATIONS

This application is a continuation of application Ser. No. 09/510,867, filed Feb. 23, 2000, now U.S. Pat. No. 6,589,062, issued Jul. 8, 2003, which is a continuation-in-part of application Ser. No. 09/286,871, filed Apr. 6, 1999 now abandoned; which application(s) are incorporated herein by reference.

FIELD OF THE INVENTION

This invention pertains to switching jacks for the telecommunication, data, and video transmission industries. More particularly, this invention pertains to a DSX module containing removable switching jacks.

BACKGROUND OF THE INVENTION

In the telecommunications industry, modules having switching jacks for performing inter-connect and cross-connect functions are well known. An example of such is shown in U.S. Pat. No. 4,815,104 to Willams et al dated Mar. 21, 1989. With reference to FIG. 5 of the '104 patent, two jacks 144 are mounted in the interior of a housing and permanently connected to cables 82, 84, 86, 88 which extend rearwardly from the jacks to connectors 74, 76, 78, 80 on a rear panel of the module housing.

The jacks used in inter-connect and cross-connect modules are well known switching jacks. In addition to those shown in U.S. Pat. No. 4,815,104, switching coax jacks are disclosed in U.S. Pat. No. 4,749,968 to Burroughs dated Jun. 7, 1988, U.S. Pat. No. 5,348,491 to Louwagie et al dated Sep. 20, 1994 and U.S. Pat. No. 5,246,378 to the Seiceanu dated Sep. 21, 1993. Both of the '491 and '378 patents teach jack modules which include not only switching components but monitor ports for permitting monitoring functions without signal interruption.

In U.S. Pat. No. 5,467,062 to Burroughs, a jack module 10 is received by a chassis 12. Jack module 10 mates with a rear interface 400. Rear interface 400 includes conductors 42, 43 which are electrically connected when a jack module 10 is not inserted within chassis 12.

Switching coax jacks are known which include center conductors which are divided into front and rear portions as shown in U.S. Pat. No. 5,885,096 to Ogren. The rear portions include movable springs to separate the rear portions 50, 52 from the front portions 42, 44. A V-shaped switching spring 70 connects the rear portions. Levers 90, 92 push the rear portions out of connection with the switching spring and into connection with the front portions upon insertion of plugs into forward ports of the jack.

Commonly owned U.S. patent application Ser. No. 08/808,086 concerns a module 10 with two removable front switching jacks 14, 14'. This allows replacement of the switching jacks, rather than the entire jack module to allow for upgrades for the switching jack or replacement of the jack in the event of failure of any one of the two switching jacks. Also, as telecommunications facilities are being developed, it is desirable to pre-cable and install modules without the need for having switching jacks present during the cabling. Then, when use of the module is desired including its switching jack function, the individual switching jacks can be added.

There is a continuing need for DSX modules including removable jacks.

SUMMARY OF THE INVENTION

According to preferred embodiments of the present invention, a switching coax jack module is disclosed which includes a housing having walls defining an interior. The walls define first and second recesses disposed along the front end of the module, each sized for receiving a jack. Coax cable connectors are secured to an end wall of the housing. Sliding coax connectors are mounted on the interior in communication with the recesses. The sliding coax connectors connect with the coax cable connectors on the end walls. Each of the sliding coax connectors is adapted to slidably receive an individual one of a mating connector of the jacks. Jacks are provided each having a jack body sized to be received within the recesses. Mating connectors are provided on rear walls of the jack bodies and positioned to slidably mate with the sliding coax connectors as the jack body is inserted into the recess. Preferably, the mating connectors on the jack bodies are configured as ports. Preferably, the jack body includes a projecting post for receipt in a recess of the module. Preferably, the sliding coax connectors of the module are positioned on a separate rear interface unit mountable to the housing. The rear interface unit can be constructed as a straight pass through between the front and the rear of the unit between the coax cable connectors secured to the end wall of the housing and the sliding coax connectors of the rear interface unit. Alternatively, the rear interface unit can be provided with a switch activated by insertion of the jack, such as by the post. The switch normally electrically connects the coax cable connectors when one of the jack bodies is not received in the respective recess. The switch opens the connection upon insertion of the jack body. In one embodiment, both sliding coax connectors are disconnected from the coax cable connectors when the jack body is not received in the respective recess. In an alternative embodiment, one of the coax cable connectors is continuously connected to the respective sliding coax connector. Such an embodiment may avoid a loss of data from one circuit breaking the loop path before the other circuit opens the through path.

BRIEF DESCRIPTION OF THE DRAWINGS

FIG. 2 is a right side view of the module of FIG. 1.

FIG. 3 is a left side view of the module of FIG. 1.

FIG. 4 is a top view of the module of FIG. 1, with portions shown in cross-section along lines 4—4 of FIG. 3.

FIG. 5 is a front view of the module of FIG. 1.

FIG. 6 is a rear view of the module of FIG. 1.

FIG. 7 is a circuit schematic for the module of FIG. 1.

DETAILED DESCRIPTION OF THE PREFERRED EMBODIMENTS

Figure 1:
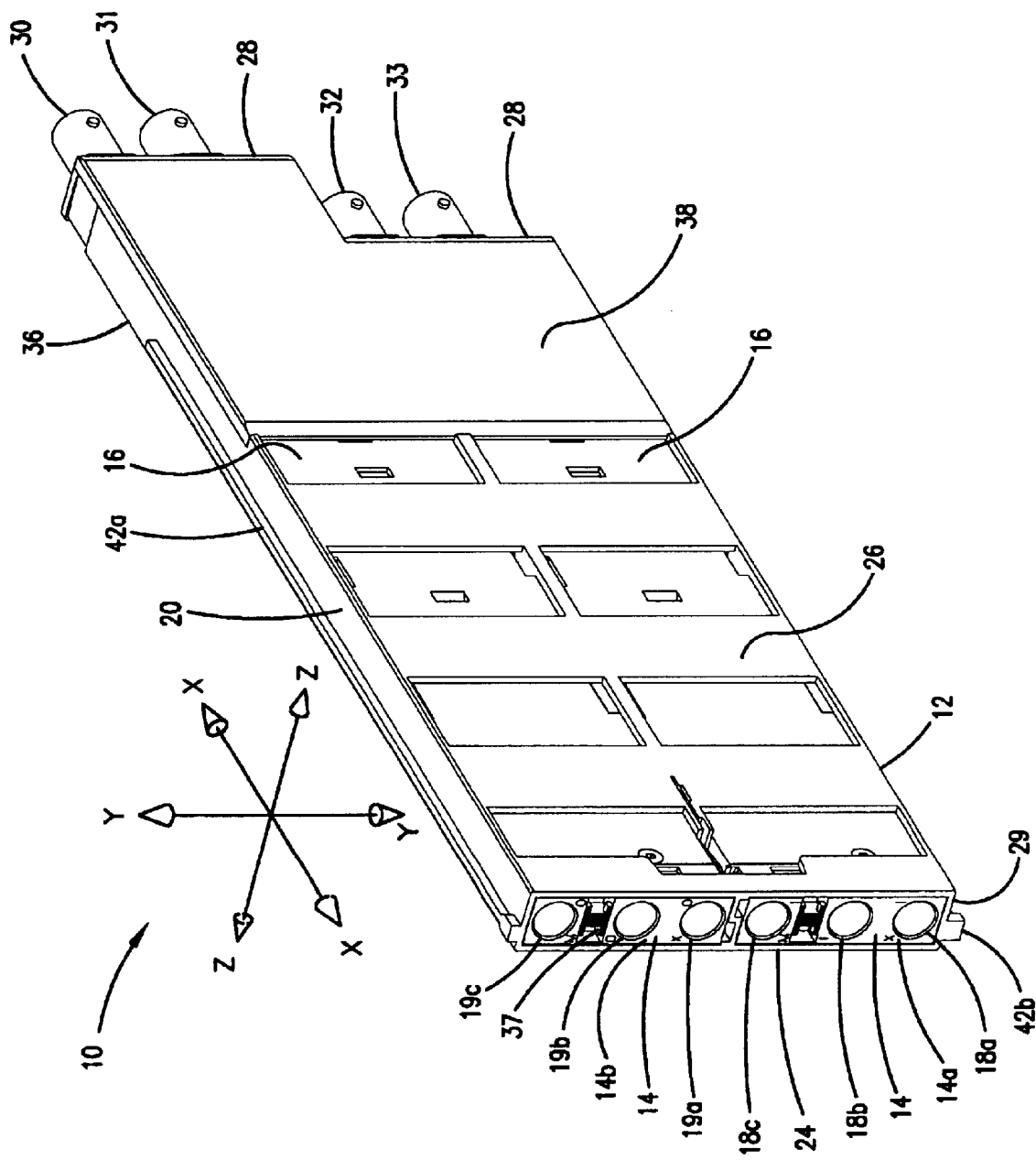
FIG. 1 is a perspective view of one embodiment of a jack module according to the present invention.

Referring now to the several drawing figures in which identical elements are numbered identically throughout, a description of preferred embodiments of the present invention will now be provided.

With initial reference to FIGS. 1–7, a first embodiment of a jack module 10 is shown including a housing 12 and two removable jacks 14. Two rear interface units 16 are positioned within housing 12, for mating with jacks 14. Housing 12 includes top and bottom walls 20, 22, and first and second opposed side walls 24, 26. A rear wall 28 includes four coaxial connectors 30, 31, 32, 33 for attachment to coaxial cables. Rear connectors 30, 31, 32, 33 are well known BNC (Bayonet Neill-Concelman) connectors in a preferred embodiment. Jack module 10 defines front access ports 18a, b, c and 19a, b, c for connection to coax connector plugs.

Jack module 10 is usable for inter-connect applications or cross-connect applications. Jack module 10 includes a longitudinal axis X—X extending from a front 29 to rear wall 28 with the top and bottom walls 20, 22 being parallel to the longitudinal axis X—X. Front 29 extends in a first transverse dimension Y—Y perpendicular to axis X—X and has a transverse width Z throughout the length of axis Y—Y. The top and bottom walls 20, 22 include rails 42a, 42b, respectively to be received within aligned grooves on a chassis into which the housing 12 may be inserted in side-by-side relation with similarly constructed modules contained within the same chassis. The lower rail 42b includes a notch 43 for engagement with a latch to securely retain module 10.

Figure 8:
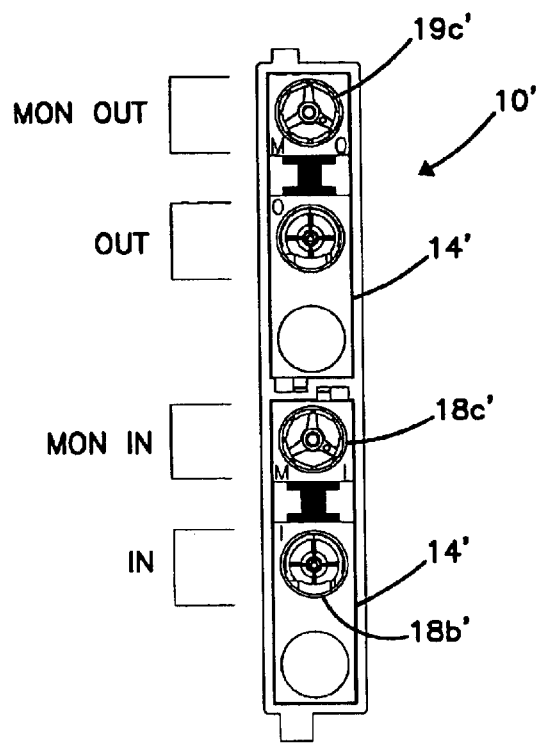
FIG. 8 is a front view of a first alternative embodiment of a jack module according to the present invention, including four front ports, instead of six as shown for the module of FIG. 1.
Figure 9:
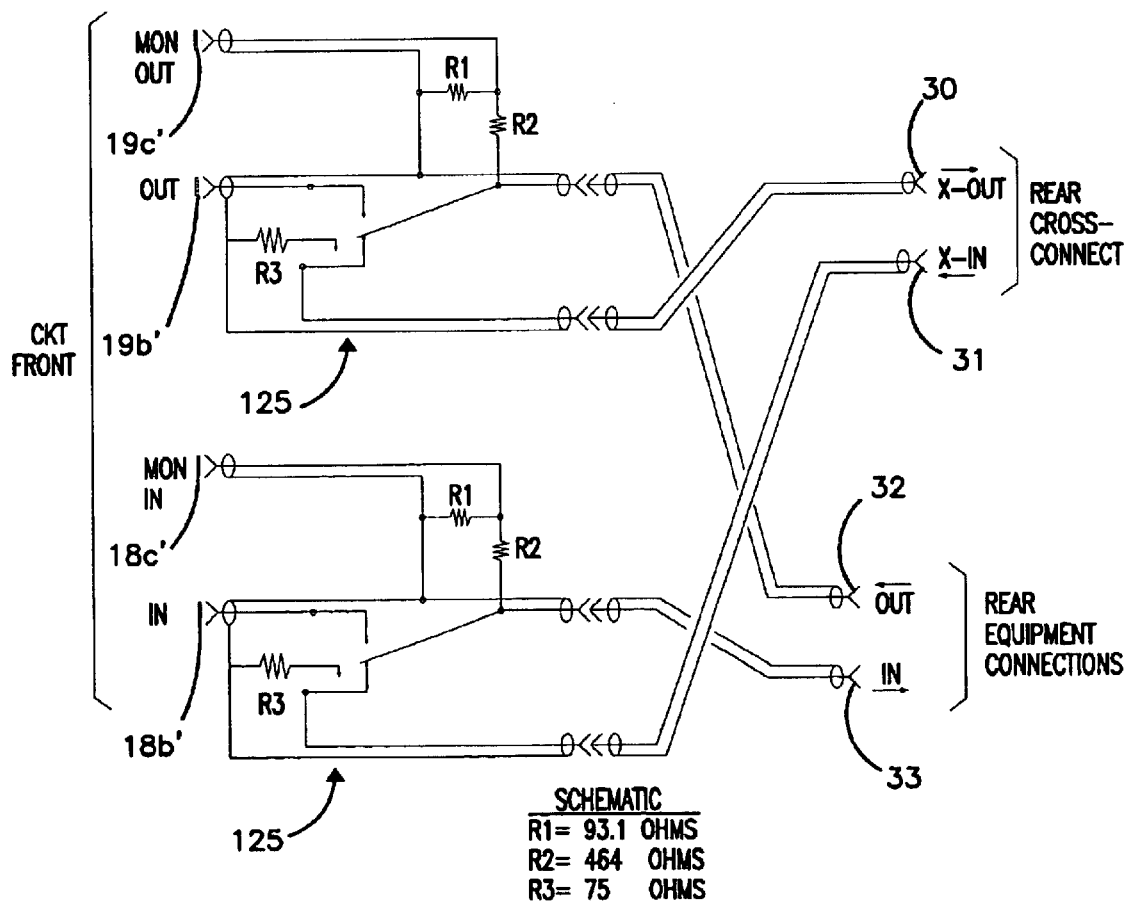
FIG. 9 is a circuit schematic for the module of FIG. 8.
Figure 10:
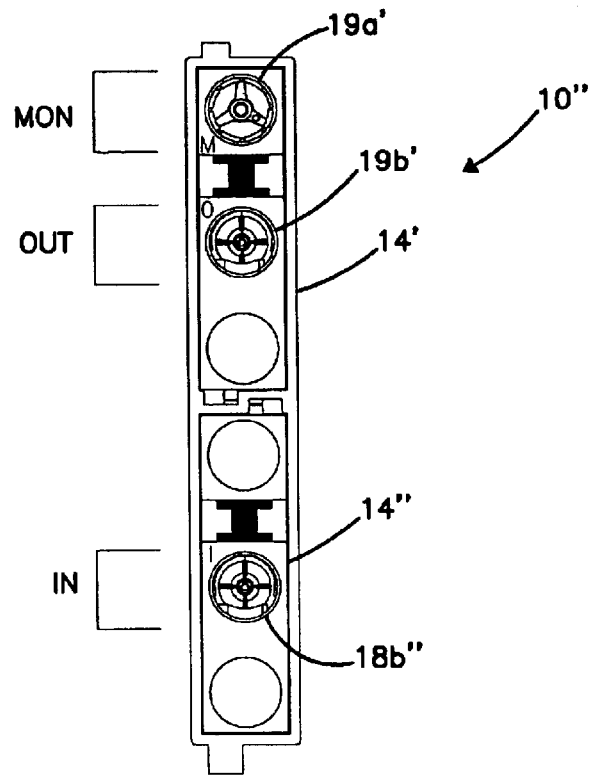
FIG. 10 is a front view of a second alternative embodiment of a jack module according to the present invention, including three front ports.
Figure 11:
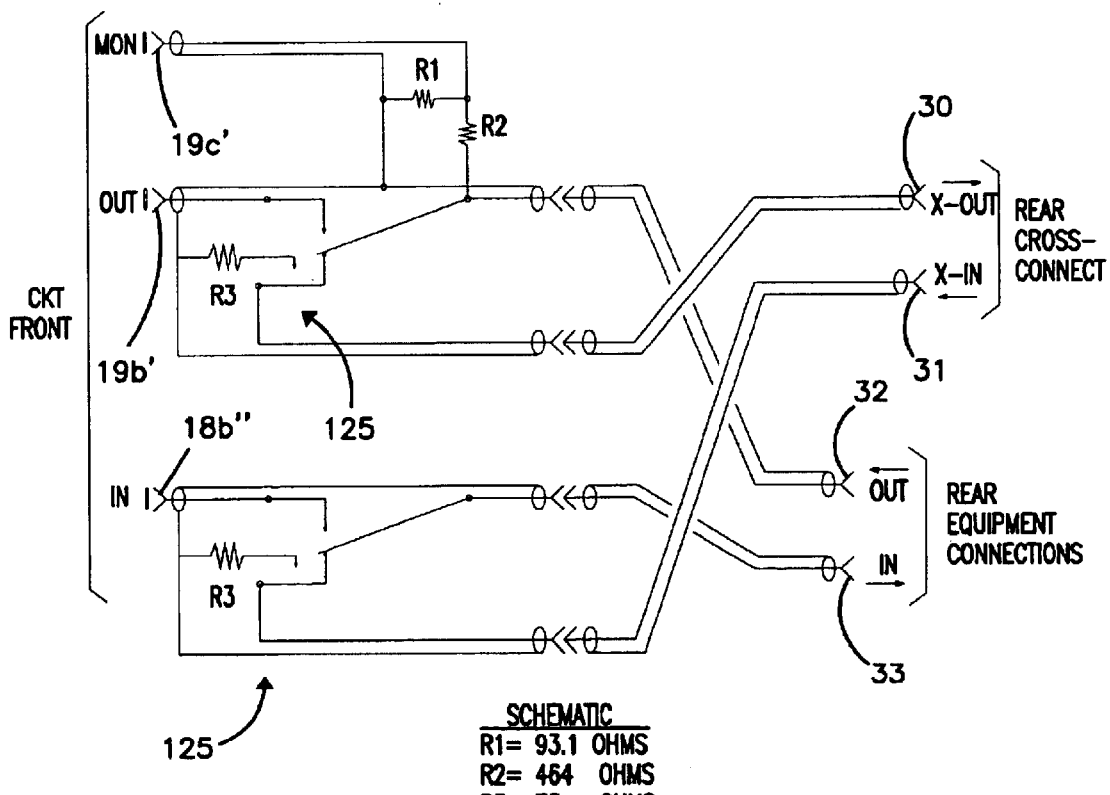
FIG. 11 is a circuit schematic for the module of FIG. 10.

Module 10 is a six port module with access ports 18a, 18b to access the in circuit path and the cross-connect in circuit path, and a monitor in port 18c, all contained in lower jack 14a. The other three ports include access ports 19a, 19b to access the out circuit path and the cross-connect out circuit path and a monitor out port 19c, from upper jack 14b. A four port module 10' is shown in FIGS. 8 and 9 using two 2-port jacks 14'. The lower jack 14' includes an access port 18b', and a monitor in port 18c'. The upper jack includes an access port 19b' and a monitor out port 19c'. A three port module 10" is shown in FIGS. 10 and 11 using a 2-port jack 14' as in FIGS. 8 and 9 and a 1-port jack 14" including an access port 18b".

Figure 12:
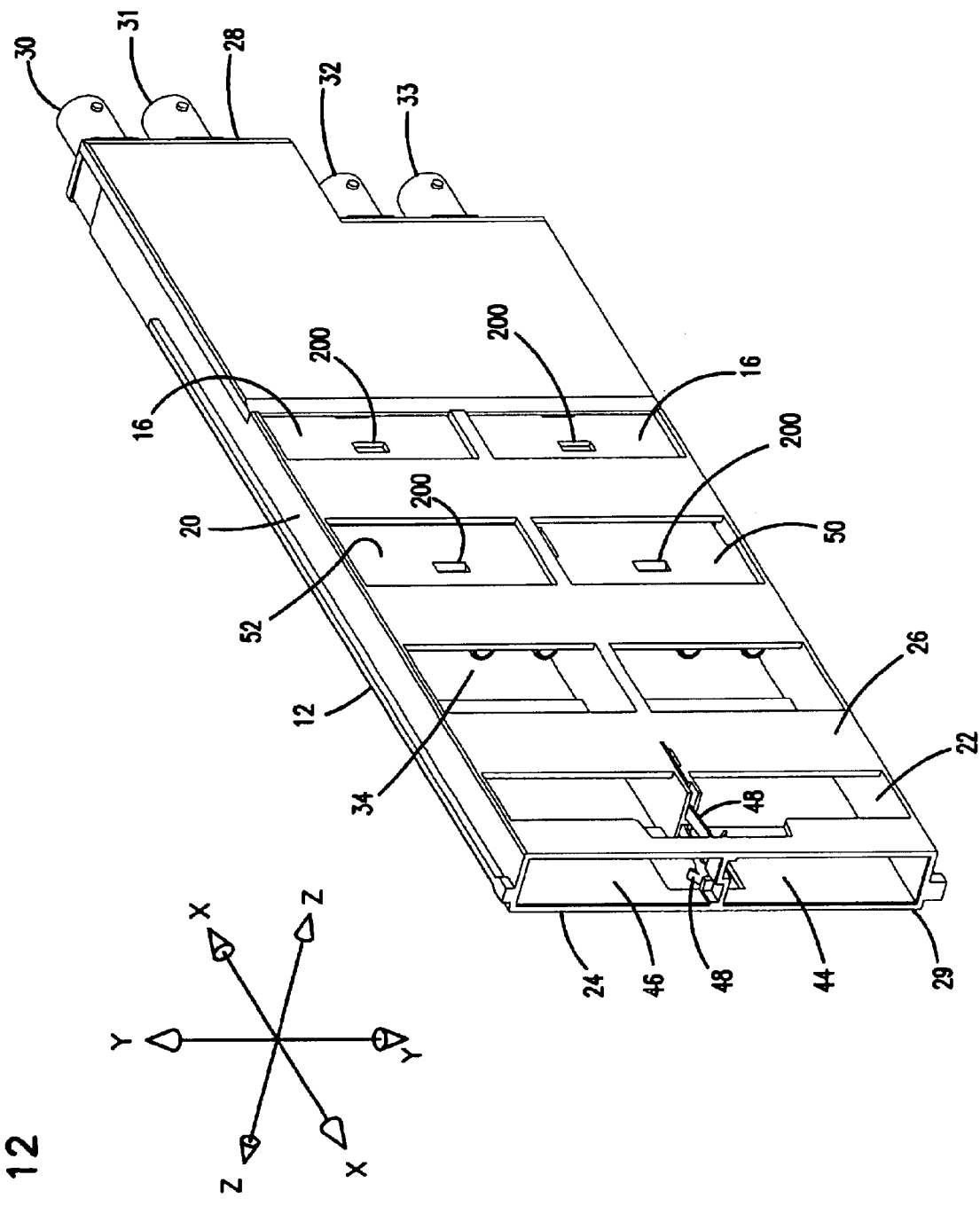
FIG. 12 is a perspective view of the module of FIG. 1, showing the module without the jacks.
Figure 13A:
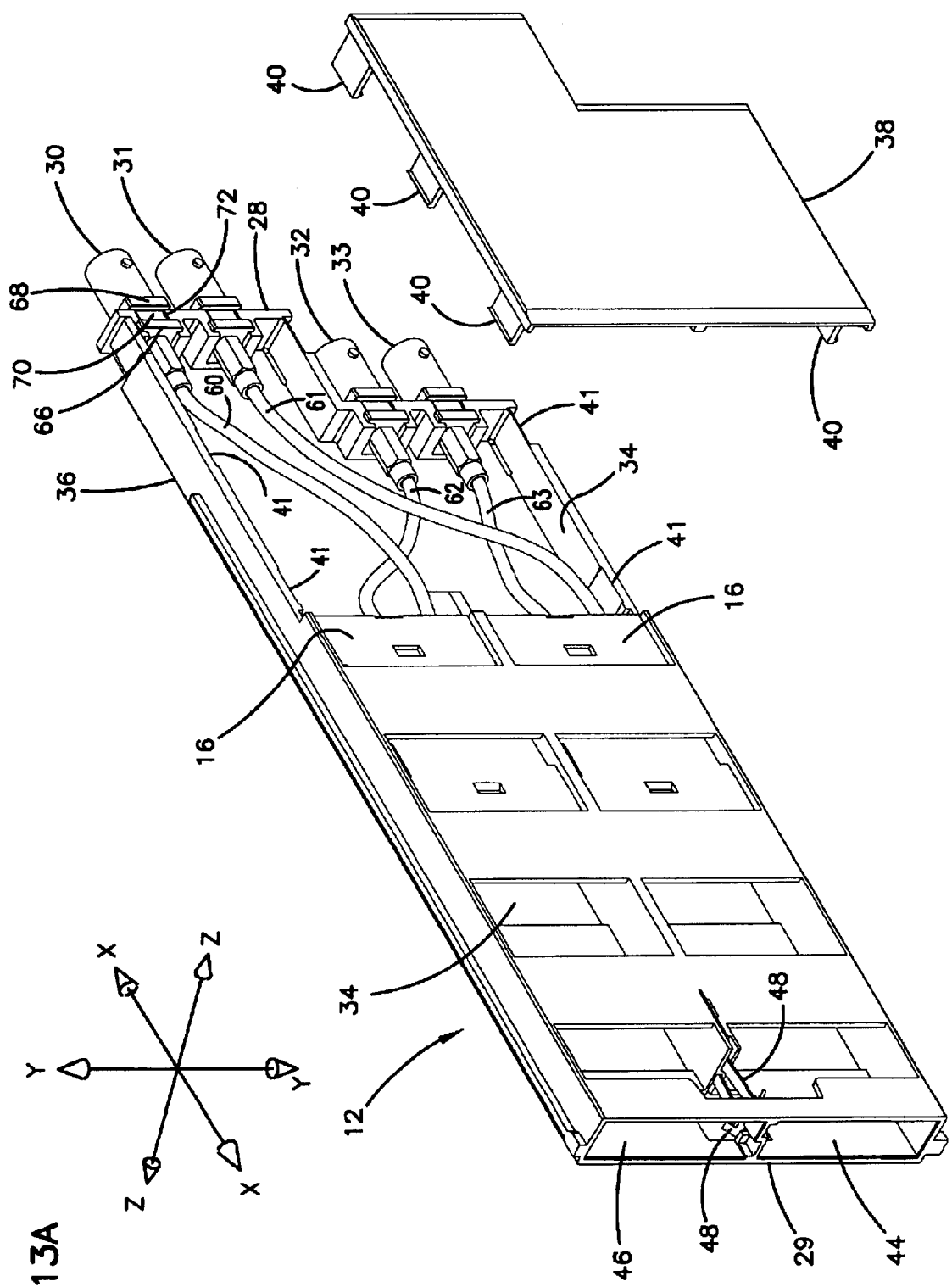
FIG. 13A is a perspective view similar to the view of FIG. 12, showing a cover of the housing separated from the remainder of the housing.
Figure 13B:
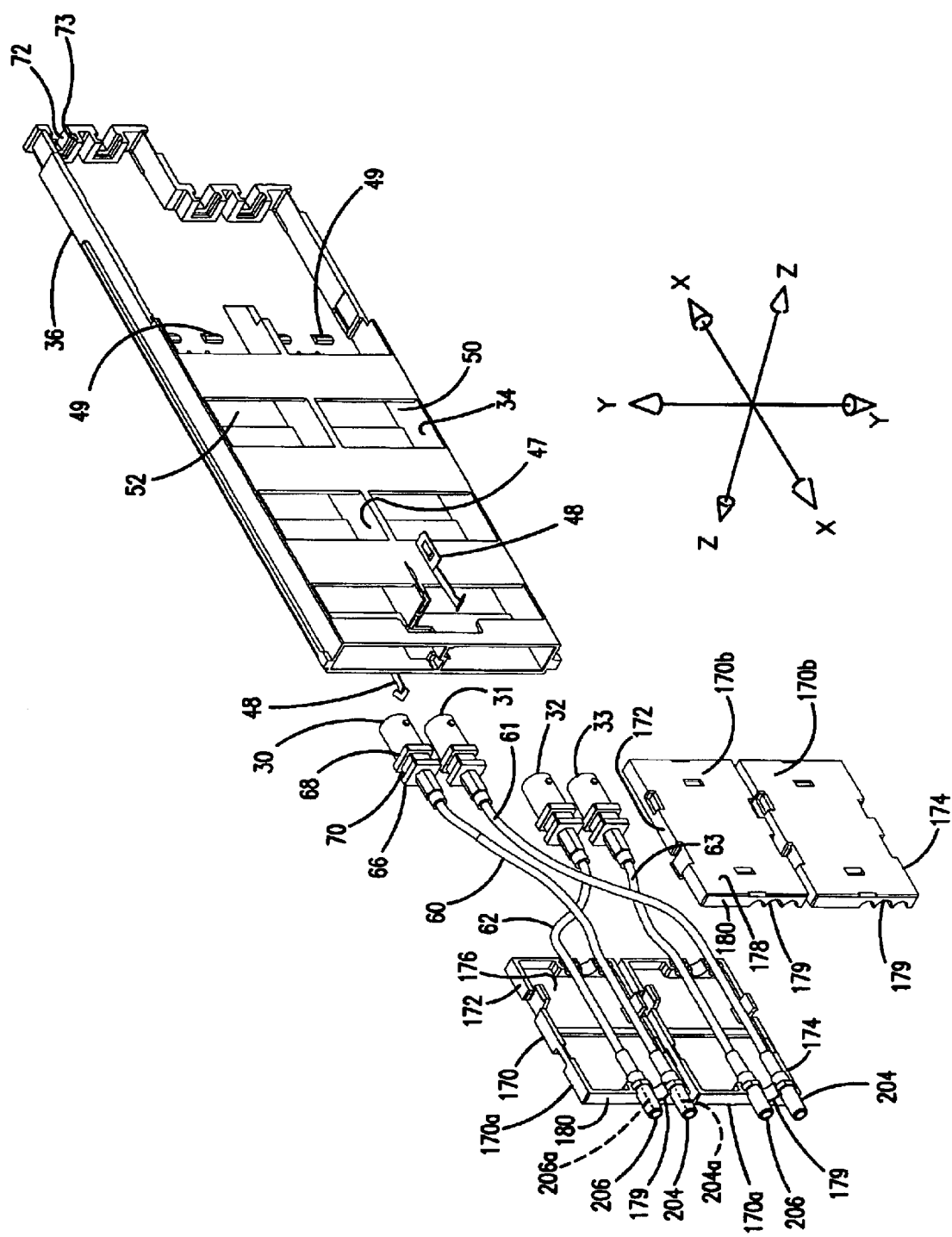
FIG. 13B is a further perspective view similar to the view of FIG. 13A, showing the remainder of the housing in exploded view, including the non-switching rear interface units.

Housing 12 includes an interior 34 for receiving jacks 14, and rear interface units 16 (see FIGS. 12, 13A, and 13B). Housing 12 in the preferred embodiment is constructed with a main housing portion 36 and a cover 38 which attaches via snaps 40 to notches 41 of main housing 36 (see FIG. 13A, for example).

Housing 12 defines the first and second jack chambers 44, 46 which are linearly aligned along axis Y—Y and open to the front 29. A central divider 47 forms chambers 44, 46. Each chamber 44, 46 has a generally rectangular cross-section in the direction of axis X—X. Each chamber 44, 46 receives one of the jacks 14. Each jack body 78 is provided with an outer perimeter which fits within the opening of each chamber 44, 46. Other mating profiles can be provided. Preferably, jack 14 can be flipped 180 degrees about axis X—X if it is desired to present a different orientation for either group of front access ports 18a, b, c or 19a, b, c for jacks 14 or the other jacks 14', 14" noted above.

Housing 12 includes a latch spring 48 in each chamber 44, 46 for engagement with a notch 100 of each jack body 78. Latch spring 48 is releasable, so as to permit removal of the jack 14 held by spring 48. A latch notch 100 is provided on an opposite corner of each jack for engagement with the latch spring 48 if the jack is reversed in its orientation. The jack fronts are generally flush with front 29 of housing 12 in the illustrated embodiment. Front notch 37 is used as a gripping portion by a suitable tool to pull jack 14 from housing, if desired.

Housing 12 further includes first and second rear interface chambers 50, 52 separated by divider 47 which are linearly aligned along the axis Y—Y for receipt of the rear interface units 16. Ramped latching tabs 45 in side wall 24 engage notches 200 in the rear interface units 16 to retain each rear interface unit 16 within housing 12. Stops 49 prevent rear interface units 16 from sliding rearwardly.

From rear interface units 16, cables 60, 61, 62, 63 extend to coax connectors 30, 31, 32, 33. In the embodiment shown, coax connectors 30, 31, 32, 33 include opposed shoulders 66, 68 and an intermediate neck 70 which cooperates with a slot 72 on rear wall 28 of housing 12 to mount the connectors 30, 31, 32, 33 to the rear wall. Shoulder 66 also fits in a slot 73 for securing the rear coax connectors. Cover 38 traps the connectors 30, 31, 32, 33 in place.

Figure 14:
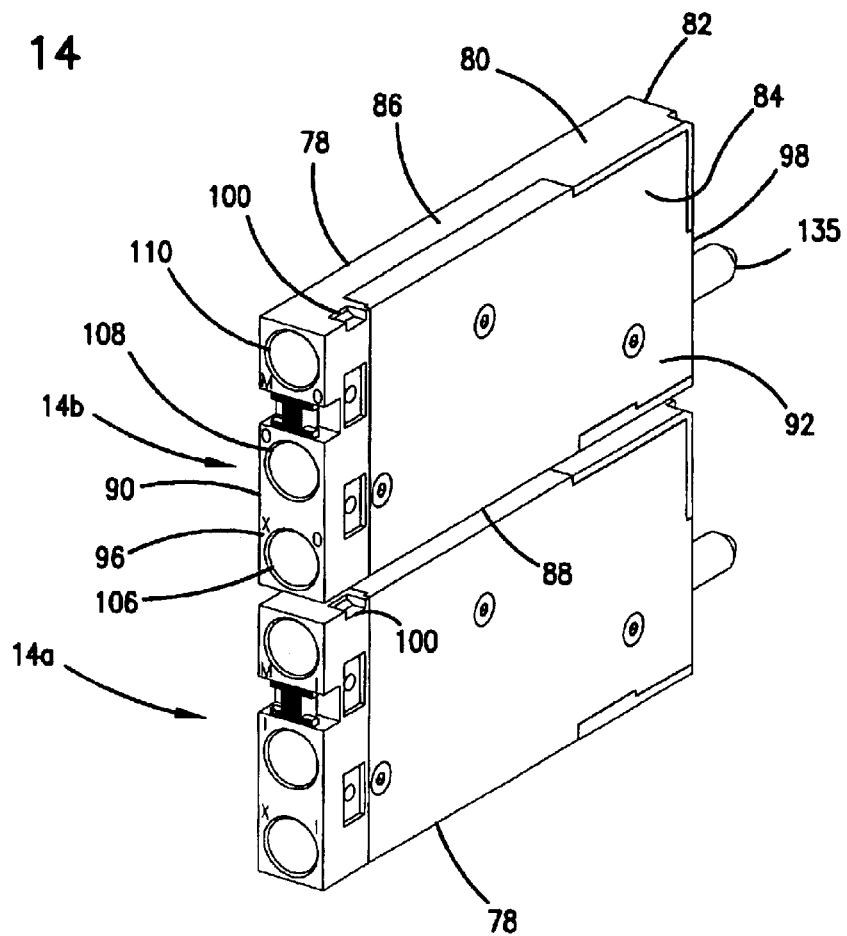
FIG. 14 is a perspective view of the two jacks of the module of FIG. 1.
Figure 15:
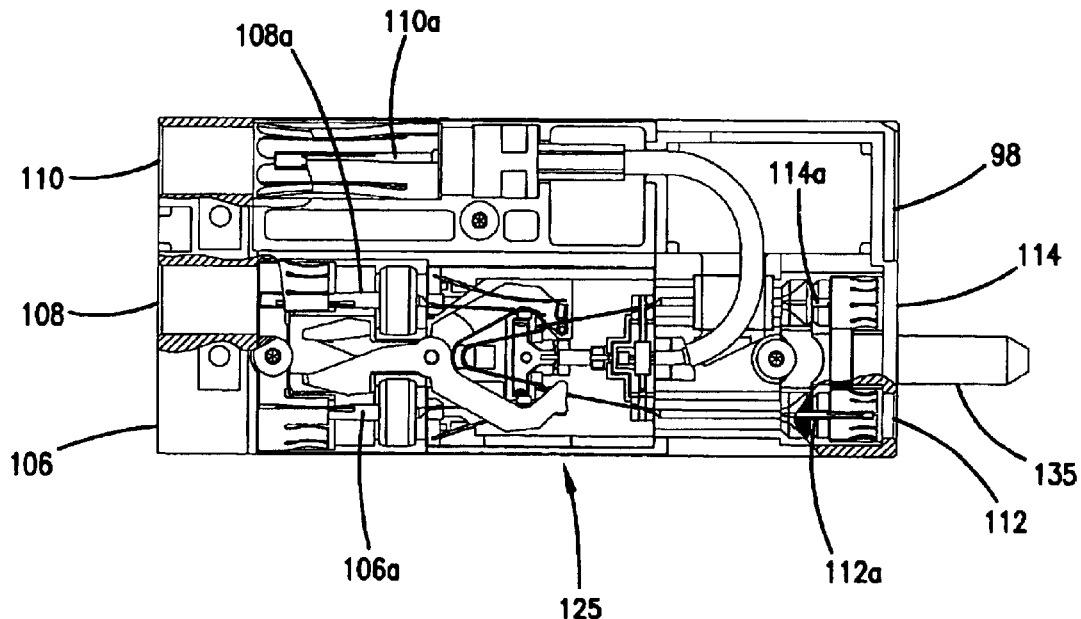
FIG. 15 is a partial cross-sectional view of one of the jacks, and with the cover of the jack housing removed.
Figure 16:
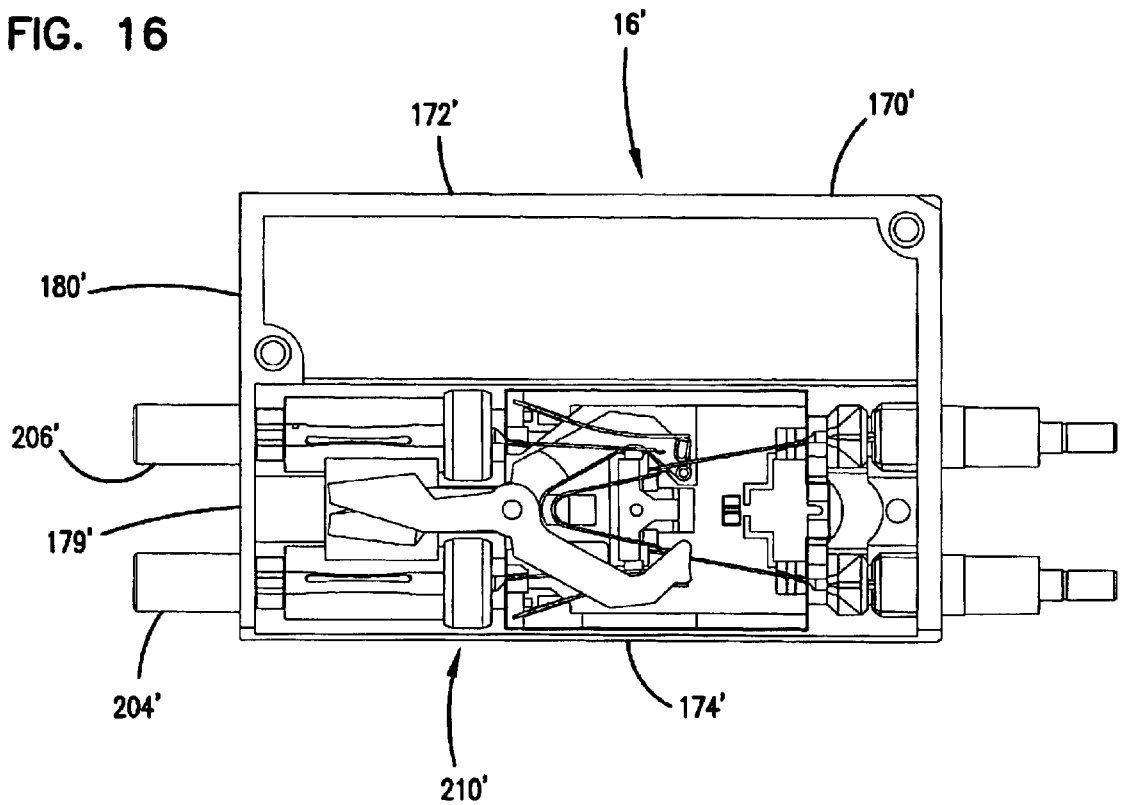
FIG. 16 is a side view of a switching rear interface unit, with a portion of the housing removed showing internal structure, useable in the jack module of FIG. 1.
Figure 17:
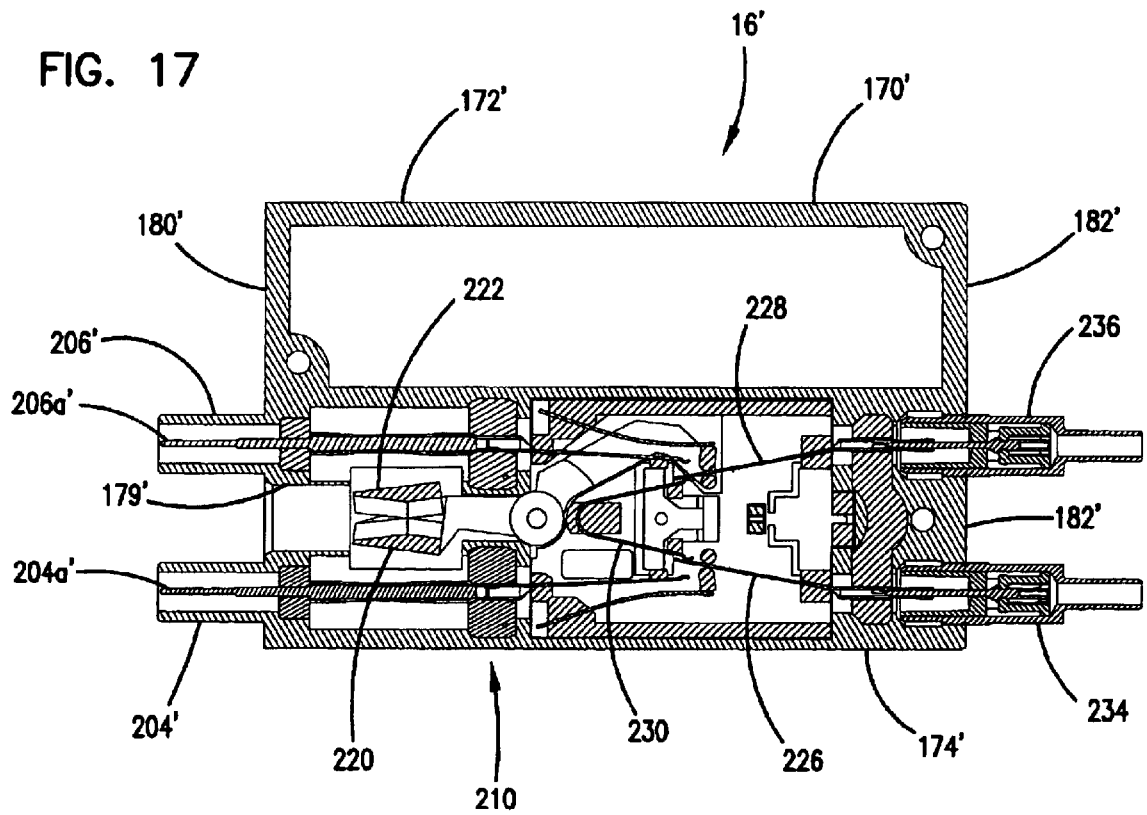
FIG. 17 is a cross-sectional side view of the switching rear interface unit of FIG. 16.
Figure 18:
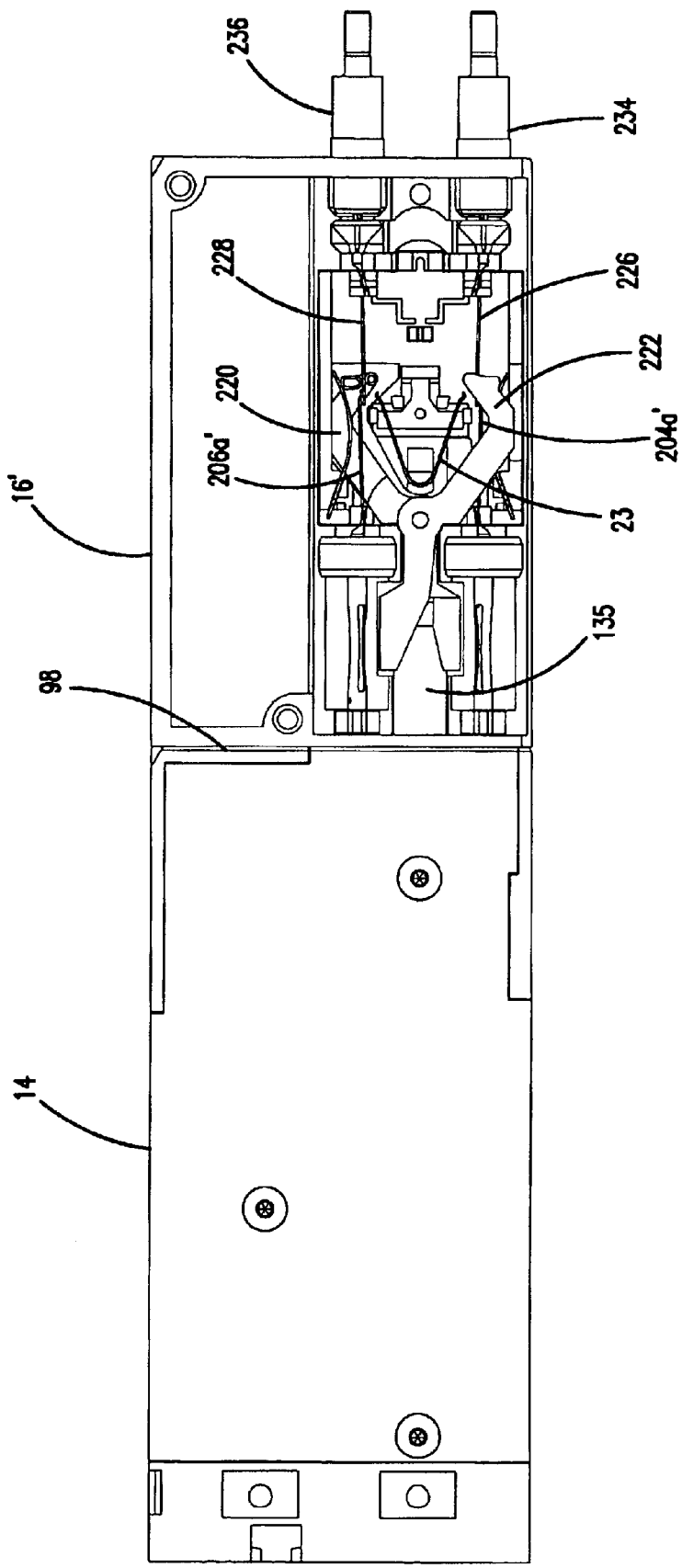
FIGS. 18 and 19 show the switching rear interface unit mounted to a jack.
Figure 19:
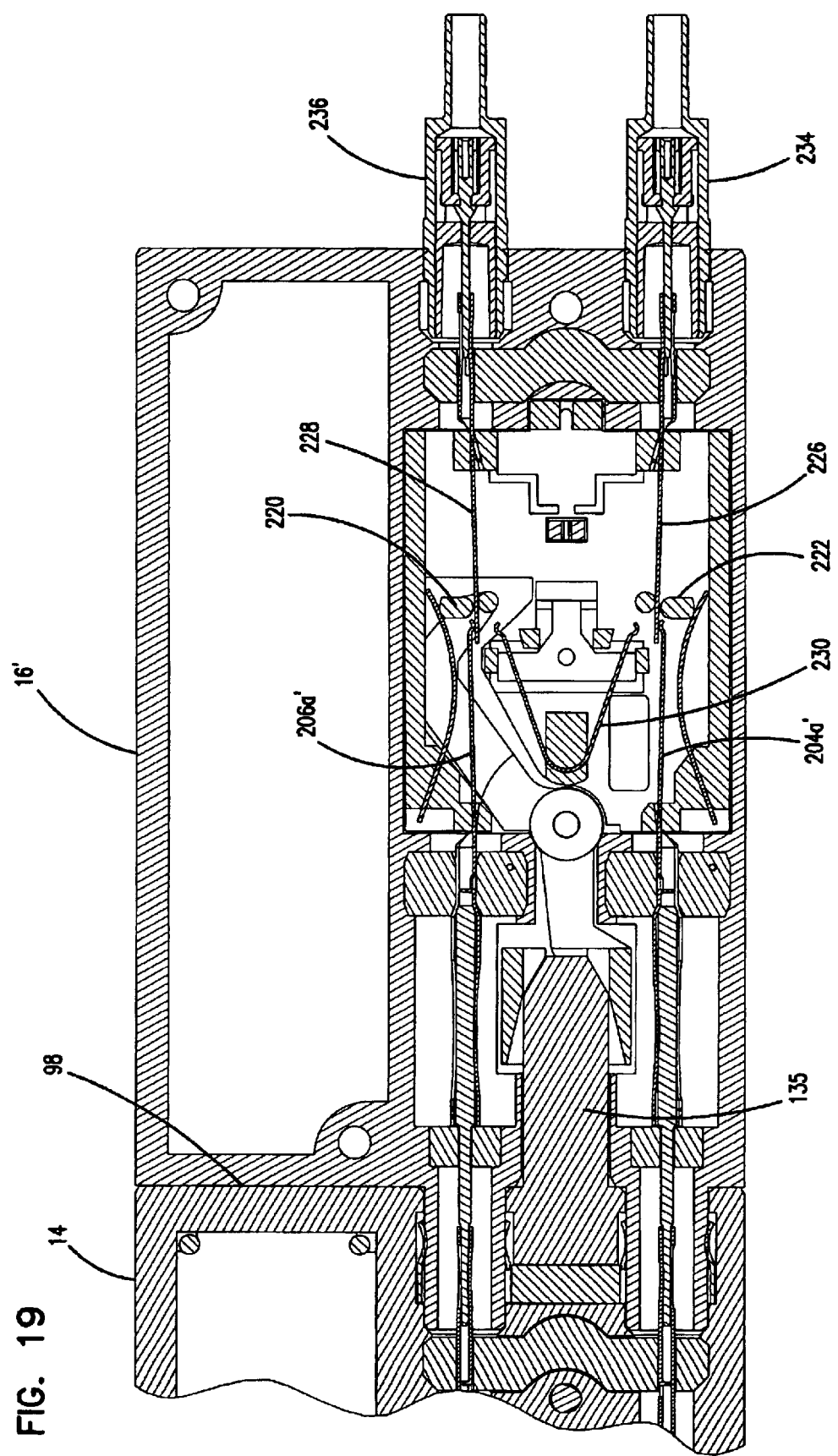

In the embodiment of FIGS. 1–7, each jack 14 is identical and includes a jack housing 80 including a main housing portion 82 and a cover 84 (see FIGS. 14 and 15). Housing 80 defines a top 86, a bottom 88 and opposed sides 90, 92. A front end 96 includes three access ports 106, 108, 110. Each of the ports exposes an interior center conductor 106a, 108a, 110a. A rear end 98 of jack housing 80 defines first and second ports 112, 114 including center conductors 112a, 114a. Port 110 defines a monitor port for jack 14 connected to a monitor circuit for monitoring one of center conductors 112a, 114a. In the example shown, center conductor 114a is monitored.

Rear end 98 is preferably planar with ports 112, 114 defining recesses within housing 80 for receipt of plugs. One advantage of providing each jack 14 with rear ports 112, 114 recessed within housing 80 instead of projecting rear connector portions is that damage to jack 14 may be prevented should jack 14 be dropped during handling while separate from housing 12.

In jack 14, a switching circuit 125 is provided between the two center conductors 112a, 114a such that insertion of a plug into either of ports 106, 108 accesses that center conductor and terminates the other center conductor to ground. Preferably the switching circuit 125 is a make before break circuit which accesses the rear center conductor before breaking connection with the other rear center conductor. Insertion of a plug into the third port 110 permits monitoring of the signal without interrupting flow of a signal. Jack housing 80 is electrically conductive to provide a groundshield for internal circuit components. It will be appreciated that jacks with such internal circuitry are known in the art. A related jack to the illustrated preferred jack of the Figures is shown in U.S. Pat. No. 5,885,096, the disclosure of which is hereby incorporated by reference. In the '096 patent, the jack includes split center conductors and two pivoting actuators or levers for moving the split center conductors. While such a feature is preferred, other switching circuits which access one rear center conductor and terminate the other to ground when a plug is inserted in front ports 106, 108 can be used in jack 14.

Each jack 14 preferably includes a projecting post 135 which projects rearwardly from planar rear end 98 for interfacing with the aligned rear interface unit 16 along axis X—X. Each non-switching rear interface unit 16 includes a housing 170 having a top 172, a bottom 174, and first and second opposed sides 176, 178. Housing 170 can be constructed from plastic, with left and right halves 170a, 170b. Front end 180 includes forwardly projecting plugs 204, 206 for receipt in rear ports 112, 114 of jack 14. Each front plug 204, 206 includes a center conductor 204a, 206a. Rear interface unit 16 can include cable connections from front center conductors 204a, 206a to two of coax connectors 30, 31, 32, 33 as shown in FIG. 13B. In that instance, post 135 of jack 14 is received within a recess or port 179 in front end 180, as an alignment guide.

As will be described below, and as shown in FIGS. 16–19, post 135 can be utilized to activate a switch 210 contained within housing 170' of a switching rear interface unit 16'. The switch 210 controls a connection between two of coax connectors 30, 31, 32, 33 and front coax center conductors 204a', 206a'. Similar parts in switching rear interface unit 16' are designated with an apostrophe.

Referring now to FIGS. 16 through 19, an example switching rear interface unit 16' including switch 210 is shown where post 135 activates the switch. Front end 180' of rear interface unit 16' includes post receiving port 179' permitting post 135 to engage actuator arms 220, 222 which pivot between positions in order to move rear center conductors 226, 228. When post 135 is not received in the post receiving port 179', rear center conductors 226, 228 connect to each other through a V-spring 230. Once post 135 is received in port 179', actuator arms 220, 222 move rear center conductors 226, 228 to contact front center conductors 204a', 206a' to switch rear interface unit 16' so as to have a straight pass through configuration between front end 180' and rear end 182'. Switch 210 is a make before break switch in that front center conductors 204a' 206a' make contact with center conductors 112a, 114a before rear center conductors 226, 228 are separated from v-spring 230. Rear coax connector portions 234, 236 connect to two of cables 60, 61, 62, 63. Housing 170' is electrically conductive to provide a ground shield for internal circuit components.

Figure 20:
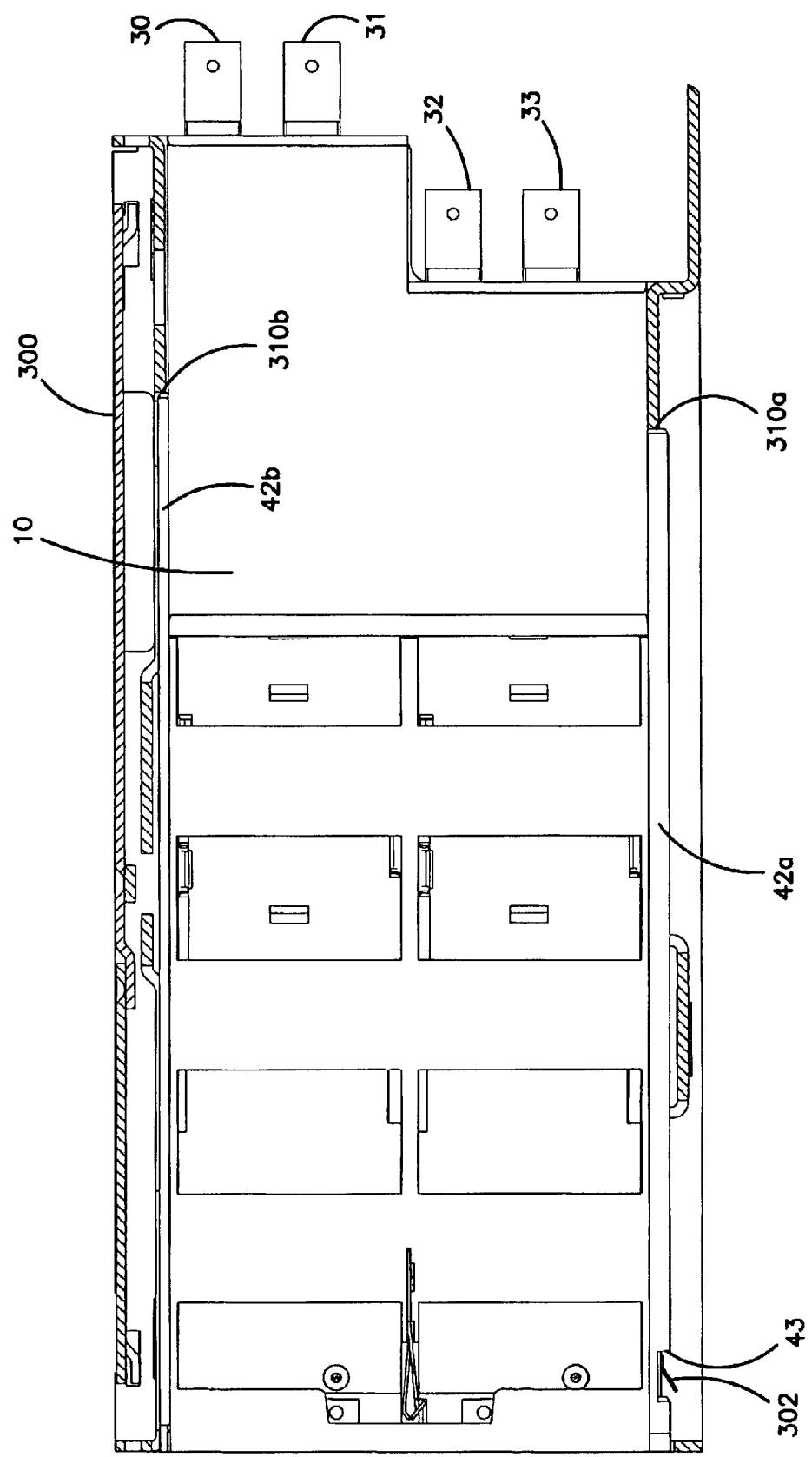
FIG. 20 is a cross-sectional side view of a chassis holding the jack module of FIG. 1.
Figure 21:
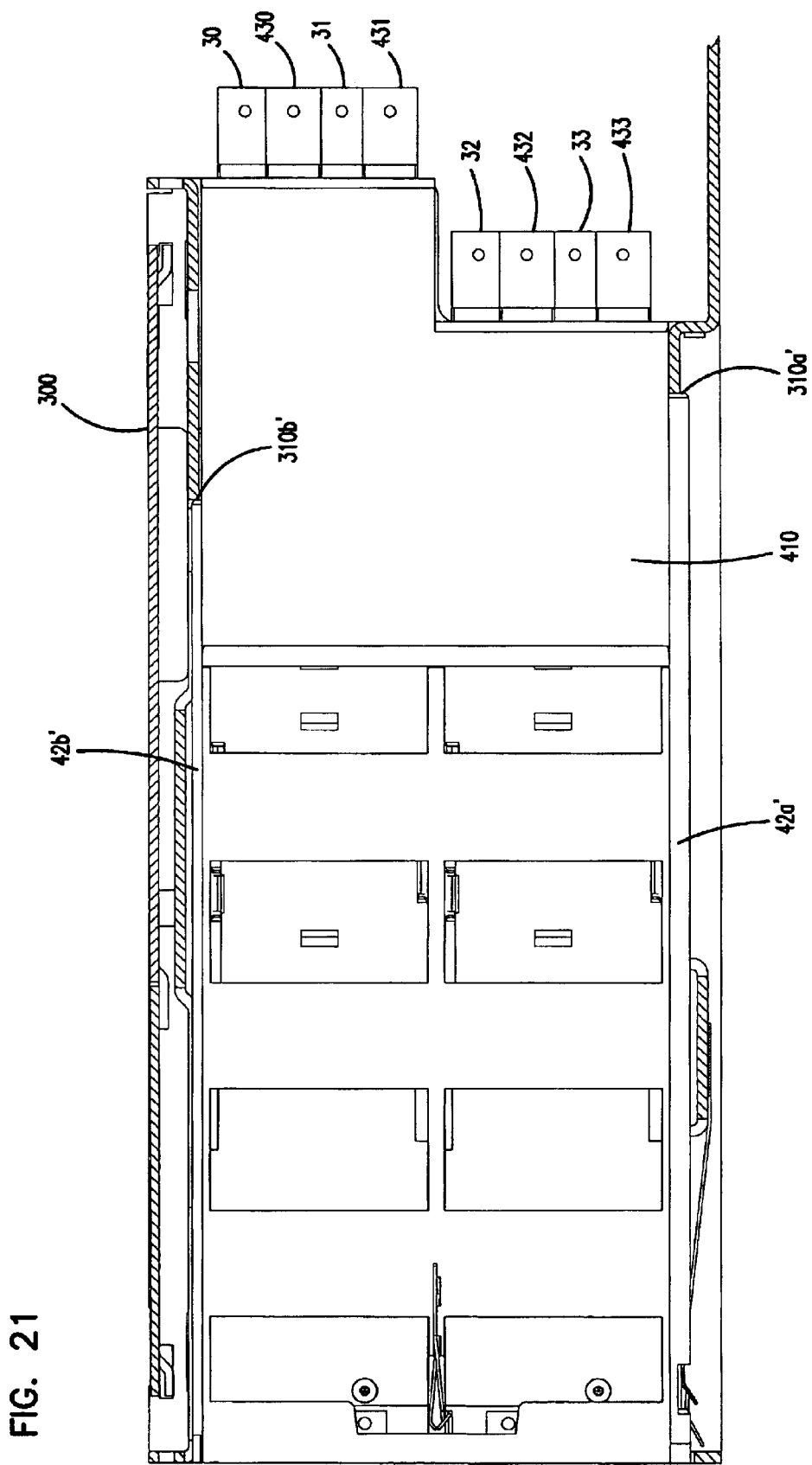
FIG. 21 is a further cross-sectional side view of the chassis and jack module of FIG. 20, and showing an alternative jack module also mounted to the chassis, with staggered rear coax connectors.
Figure 22:
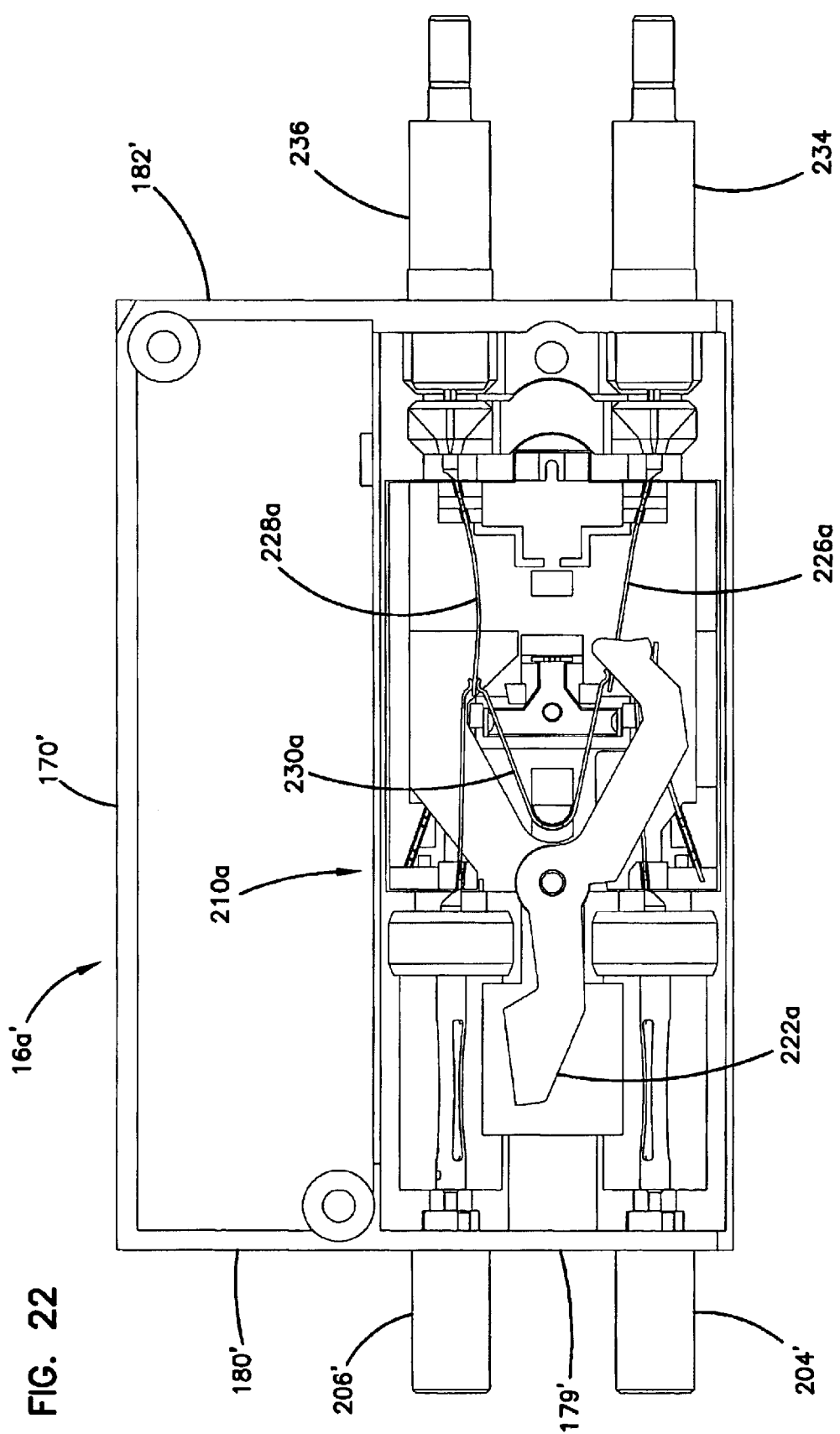
FIG. 22 is a side view of an alternative switching rear interface unit, with a portion of the housing removed showing internal structure, usable in the jack module of FIG. 1.
Figure 23:
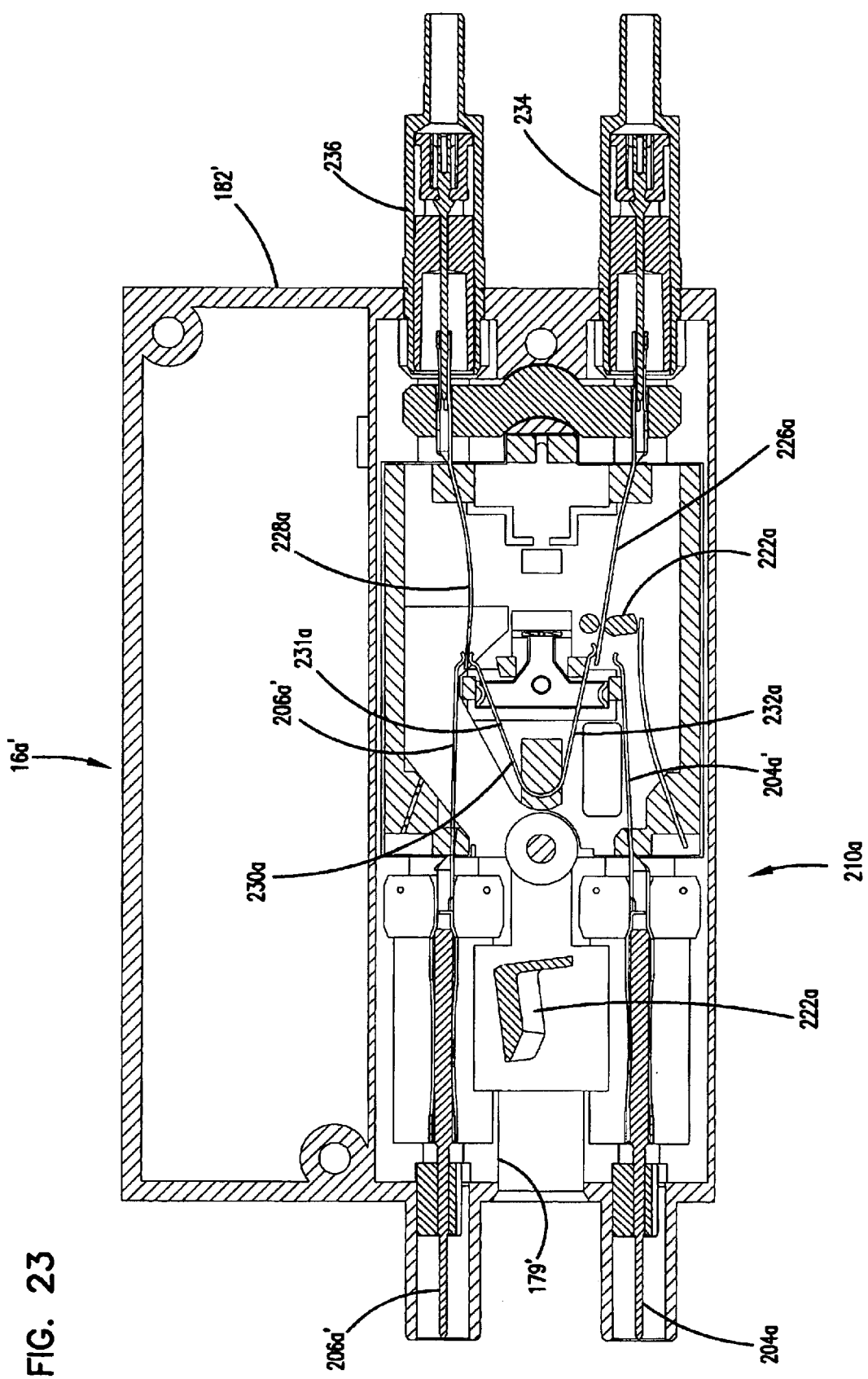
FIG. 23 is a cross-sectional side view of the switching rear interface unit of FIG. 22.
Figure 24:
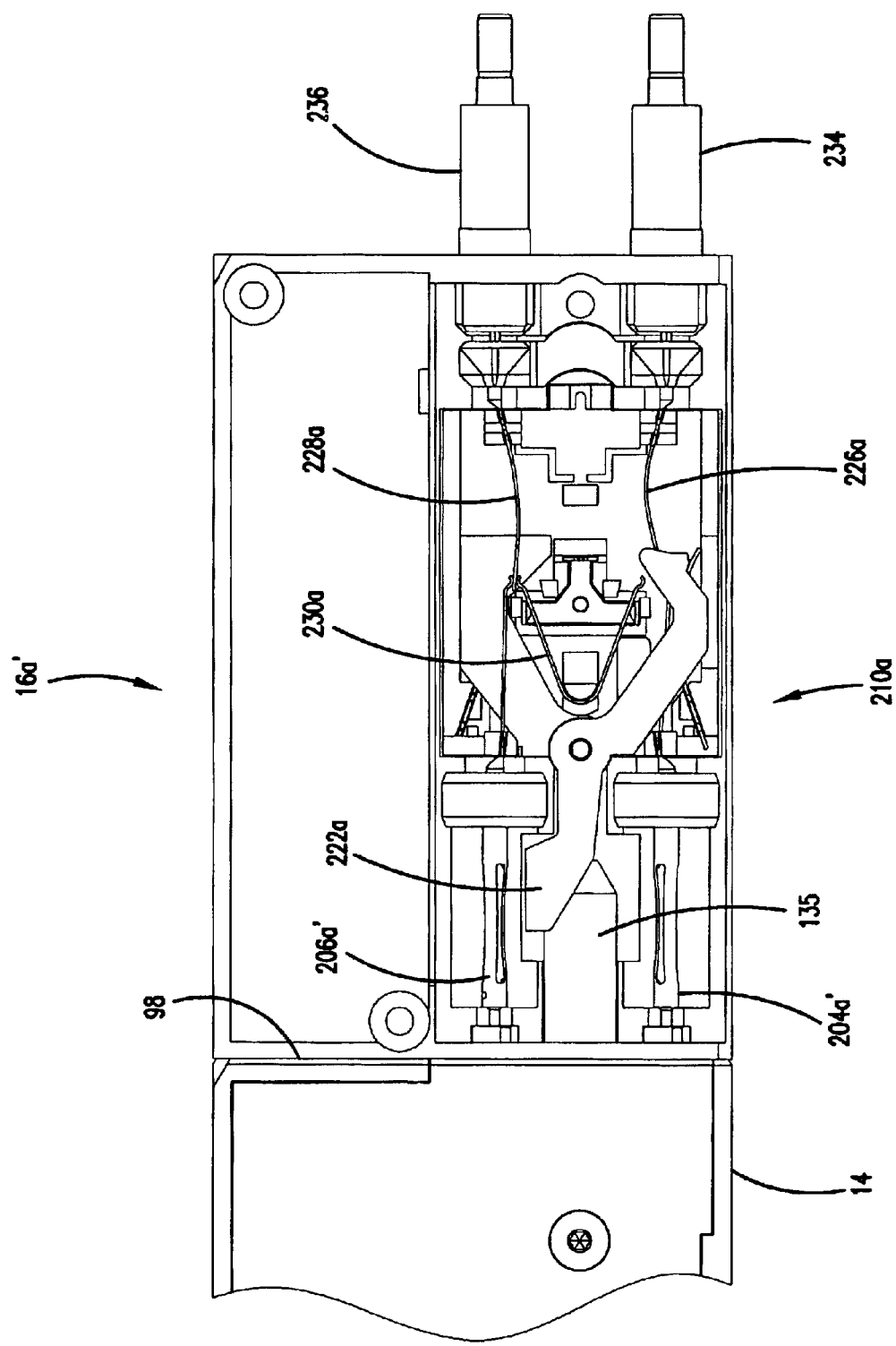
FIGS. 24 and 25 show the switching rear interface unit of FIGS. 22 and 23 mounted to a jack.
Figure 25:
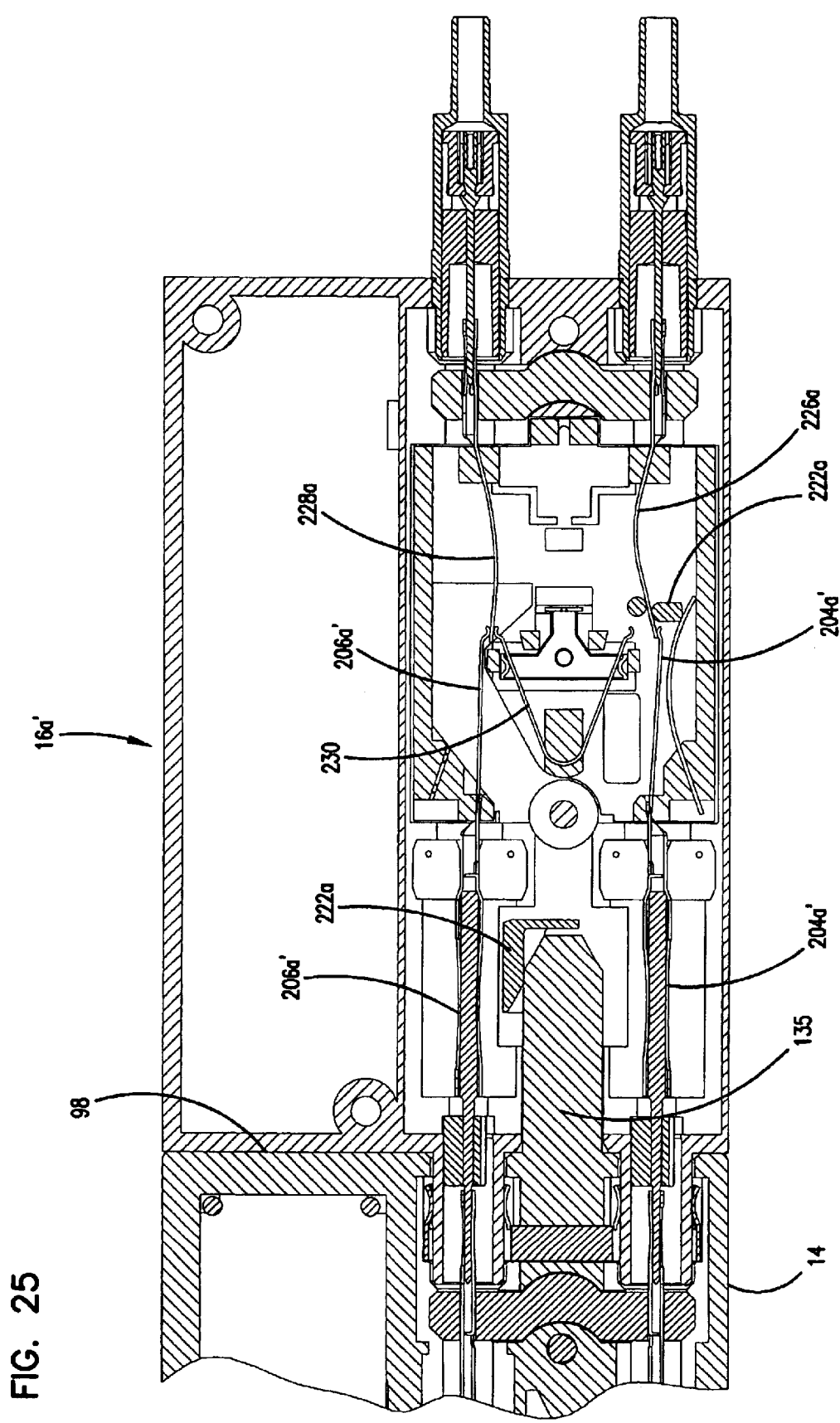

An example chassis 300 is shown in FIGS. 20 and 21. FIG. 20 illustrates jack module 10 mounted to chassis 300. FIG. 21 is a different cross-section of chassis 300 where a second jack module 410 is positioned. Jack module 10 is behind second jack module 410 in FIG. 21. FIG. 20 also shows latch 302 holding module 10 to chassis 300. FIG. 21 illustrates a second jack module 410 having similar circuitry and front ports as any one of jack modules 10, 10', 10". One difference between jack modules 10 and 410 is the lateral positioning of rear connectors 30, 31, 32, 33. Jack module 410 includes lower positioning of each connector 430, 431, 432, 433 relative to jack modules 10, 10', 10". When alternated in chassis 300, the connectors are alternately staggered, for increased density of jack modules in the chassis. To assist the installer avoid two identical jack modules being installed side by side, chassis 300 includes mating structure in guides 310a, 310b which only mates with the rails of one of the two different jack modules. Because of their lengths, groove 310a will only mate with rail 42a of module 10, and groove 310b will only mate with rail 42b of module 10. Similarly, groove 310a' will only mate with rail 42a' of module 410, and groove 310b' will only mate with rail 42b' of module 410. The rails 42a, 42b are offset from the center in the Z—Z axis direction (see FIGS. 5 and 6) for jack module 10. Also, the rails 42a, 42b have different heights in the Y—Y axis direction. A similar configuration exists for jack modules 10', 10" and 410. This prevents a jack module 10, 10', 10" 410 from being installed upside down.

Referring now to FIGS. 22–25, an alternative example switching rear interface 16a' including a switch 210a is shown where post 135 of jack 14 activates the switch. Like parts in FIGS. 22–25 are shown with identical reference numbers as used in FIGS. 16–19. A significant difference in switching rear interface 16a' is that only a single actuator arm 222a is provided to move one rear center conductor 226a to contact front center conductor 204a' to switch rear interface unit 16a' so as to have a straight pass through configuration between front end 180' and rear end 182'. Arm 222a moves rear center conductor 226a out of contact with the v-spring 230a upon insertion of jack 14, and post 135 into port 179'. Specifically, rear center conductor 226a breaks contact with arm 232a of v-spring 230a upon insertion of post 135 into port 179'. Rear center conductor 228a is continuously connected to front center conductor 206a' and to arm 231a of v-spring 230a, such as by a spring bias. Such a design may be advantageous if post 135 from jack 14 happens to enter rear interface 16a' at an angle. The single actuator arm design will not cause a loss of data from one circuit breaking the loop path before the other circuit opens the through path, as may occur in the embodiment of switching rear interface 16' of FIGS. 16–19.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A jack module, comprising:
   a) an interface unit having a first signal pathway between first and second rear connectors of the interface unit; and
   b) a jack having interface structure for interfacing with the interface unit, the jack being configured for selective interconnection with the interface unit to provide a second signal pathway between the jack and one of the first and second rear connectors, wherein the interface structure of the jack interrupts the first signal pathway to provide the second signal pathway without defining the second signal pathway.

2. The jack module of claim 1, wherein the interface structure includes a projection post configured to contact a switching mechanism within the interface unit, the switching mechanism being configured to switch between the first signal pathway and the second signal pathway.

3. The jack module of claim 2, wherein the switching mechanism includes first and second pivoting arms, each of the pivoting arms being configured to pivot relative to one another when contacted by the interface structure to interrupt the first signal pathway.

4. The jack module of claim 1, wherein the interface unit includes first and second connections extending from a front end of the interface unit, the first and second connections being configured for receipt within recesses formed in the jack, the second pathway being defined through the interconnection of the first and second connections of the interface unit and the recesses of the jack.

5. The jack module of claim 4, wherein the interface structure is a single projection extending from a rear end of the jack, the single projection being configured for receipt within a front opening of the interface unit.

6. The jack module of claim 4, wherein the jack includes a jack switch mechanism, the jack switch mechanism being configured to provide electrical communication between the second signal pathway and a plug inserted within an access port of the jack.

7. The jack module of claim 6, wherein the jack switch mechanism includes first and second pivoting arms configured such that only one of the pivoting arms pivots relative to the other to provide electrical communication between the plug and the second signal pathway.

8. A jack module, comprising:
  a) an interface unit having a front end and a rear end, the interface unit including first and second connectors located at the rear end of the interface unit;
  b) a jack having a front end and a rear end, the jack including interface structure located at the rear end of the jack and plug ports located at the front end of the jack;
  c) a first signal pathway defined between the first and second connectors of the interface unit when the jack is disconnected from the interface unit;
  d) a second signal pathway defined between the jack and one of the first and second connectors of the interface unit when the jack is interconnected to the interface unit, the second signal pathway being separate from the interface structure of the jack.

9. The jack module of claim 8, wherein the interface unit includes first and second connections extending from the front end of the interface unit, the first and second connections being configured for receipt within recesses formed in the jack, the second pathway being defined through the interconnection of the first and second connections of the interface unit and the recesses of the jack.

10. The jack module of claim 8, wherein the interface unit includes an interface switch mechanism, the interface structure being configured to contact the interface switch mechanism to switch the signal pathway of the jack module from the first signal pathway when the jack is disconnected from the interface unit to the second signal pathway when the jack is interconnected to the interface unit.

11. The jack module of claim 10, wherein the interface switch mechanism includes a first arm and a second arm, the first and second arms being connected at a pivot point, each of the first and second arms having a first end and a second end, wherein each of the second ends of the first and second arms move apart from one another when the jack interconnects with the interface unit.

12. The jack module of claim 9, wherein the interface structure is a single projection extending from the rear end of the jack, the single projection being configured for receipt within a front opening of the interface unit.

13. The jack module of claim 9, wherein the jack includes a jack switch mechanism, the jack switch mechanism being configured to provide electrical communication between the second signal pathway and a plug inserted within one of the access ports of the jack.

14. The jack module of claim 13, wherein the jack switch mechanism includes a first arm and a second arm, the first and second arms being connected at a pivot point, each of the first and second arms having a first end and a second end, wherein only one of the second ends of the first and second arms pivots relative to the other arm to provide electrical communication between the plug and the second signal pathway.

* * * * *